United States Patent
Anemogiannis et al.

[11] Patent Number: 5,965,876
[45] Date of Patent: Oct. 12, 1999

[54] APPARATUS AND METHOD FOR DETECTING OPTICAL FIBER FAULT LOCATION

[75] Inventors: Emmanuel Anemogiannis, Atlanta; Leo J. Thompson, Lilburn, both of Ga.

[73] Assignee: Verifiber Technologies, Inc., Duluth, Ga.

[21] Appl. No.: 08/915,491

[22] Filed: Aug. 20, 1997

[51] Int. Cl.[6] .................................................. G01N 21/00
[52] U.S. Cl. ..................................... 250/227.15; 356/73.1
[58] Field of Search .......................... 250/227.11, 227.14, 250/227.15, 227.16; 356/73.1

[56] References Cited

U.S. PATENT DOCUMENTS 5,069,544  12/1991  Buerli ...................................... 356/73.1
5,453,827   9/1995  Lee ...................................... 250/227.15
5,500,730   3/1996  Johnson ............................... 250/227.15

*Primary Examiner*—Edward P. Westin
*Assistant Examiner*—Kevin Pyo
*Attorney, Agent, or Firm*—John Victor Pezdek

[57] ABSTRACT

A method and apparatus for detecting a fault, such as a break or crack in a fiber optic cable. A test device transmits into a first end of fiber bundle under test a first pulse of optical energy. The time duration and/or intensity of the pulse propagating through the fiber after being reflected back through the fiber are determined and stored in memory. At a later point in time this step is repeated with a second pulse. If the propagation time and/or intensity of the second pulse varies by greater than a predetermined amount from that of the first pulse an alarm condition is indicated. From the propagation time of the second pulse a length is calculated and provided to the user. This length corresponds to the location of the fault.

14 Claims, 3 Drawing Sheets

5,965,876

APPARATUS AND METHOD FOR DETECTING OPTICAL FIBER FAULT LOCATION

BACKGROUND OF THE INVENTION

This application relates to an apparatus and method for detecting a catastrophic fault in an optical fiber and more specifically to an apparatus for automatically detecting and indicating a location of an optical fiber fault.

It is well known to use fiber optical cables to transmit video, data or telecommunications signals over long distances between multiple locations. Fiber optic cables are typically provided in large bundles and have lengths of many miles. They are typically laid underground and connect one communications location to another location. These fibers may deteriorate the optical signal passing therethrough due to fiber bending, partial faults (cracks), accidental nicking, and/or other physical causes.

Because fibers are typically located underground and in large bundles, it is difficult to locate the position of the fiber's deterioration. It has also been a problem to continuously and to easily monitor the fiber bundle to determine if a deterioration condition develops when signals are being passed through the fiber.

SUMMARY OF THE INVENTION

An object of this invention is to provide an improved method and apparatus for detecting a fault in an optical fiber.

Another object of this invention is to provide a method and apparatus for monitoring an arbitrary number of fibers to determine the location of faults in the fibers.

A further object of this invention is to determine optical signal deterioration in the fiber due to fiber bending, partial faults (cracks) and/or other physical causes.

It is an additional object of this invention to determine a distance of a fault in a fiber by detecting a time duration through which the pulse propagates through the fiber from the first end and is reflected back to the first end.

It is also an object of this invention to indicate to the user the location of one or more faults in a fiber bundle.

These and other objects are provided with a method for detecting a defect in an optical fiber. The method includes the steps of transmitting into a first end of a normal fiber under test a pulse of optical energy and detecting a time duration through which the pulse propagates through the fiber from the first end and is reflected back. A variable corresponding to the first length of the fiber under test is stored in memory using the detected propagation time of the pulse of optical energy. These steps are then repeated at a later time with a second pulse of optical energy. The time from transmission to return of the second pulse propagating through the fiber under test is detected and a second variable corresponding to the second length is computed. This second variable would then be compared with the first variable. If a break in the fiber were present, the first variable computed would vary greater than a predetermined amount from the second variable. An error indication would then be provided along with a location of the break computed from the second variable. It may be preferable that in addition to detecting and comparing the reflected optical pulse, the intensity of the first and second reflected pulse are detected and compared. If the intensity varies by greater than a predetermined amount, an error indication is also provided.

In another embodiment of the invention an apparatus for detecting a defect in an optical fiber would include an optical transmitter transmitting into a first end of fiber under test a first pulse of optical energy and for transmitting into the first end a predetermined time period later a second pulse of optical energy. An optical receiver detects a propagation time duration of the first pulse and second pulse propagating through the fiber from the first end and being reflected back to the first end. A processor is included to store in a memory a first variable corresponding to the detected propagation time duration of the first pulse of optical energy. The processor stores in memory a second variable corresponding to a detected propagation time duration of the second pulse of optical energy. This second variable corresponds to the length of the fiber under test through which the second pulse of optical energy travels after hitting a fault. The processor compares the variable computed from the propagation time of the first pulse of optical energy with the variable computed from the propagation time of the second pulse of optical energy. The processor then indicates an error condition if the variable computed from the propagation time of the second pulse of optical energy varies greater than a predetermined amount from the variable computed from the propagation time of the first pulse of optical energy thereby indicating a break in the fiber. Upon indication of an error condition, the processor computes from the second variable a distance to the location of the fault.

DESCRIPTION OF THE PREFERRED EMBODIMENTS

Figure 1:
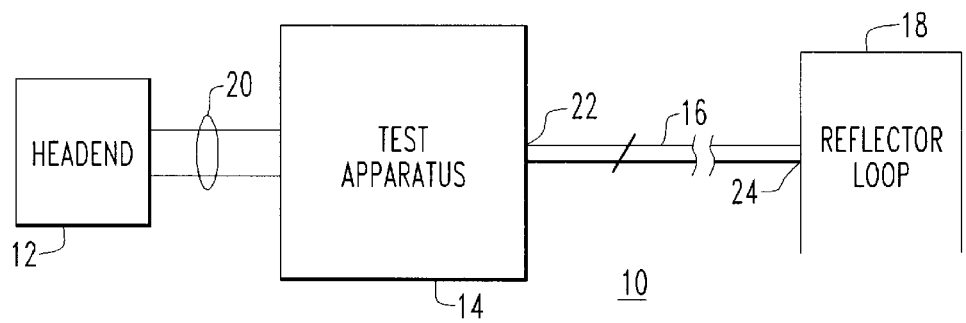
FIG. 1 is a block diagram of a system for determining the location of a fault of a fiber in accordance with the invention.

Referring to FIG. 1, there is shown a system 10 having test apparatus 14 coupled through signal lines 20 to headend 12 and coupled through fiber bundle 16 to a light reflector 18, which is preferably, a loop. Test apparatus 14 periodically transmits an initial optical signal through a first end 22 of each one of the normal fibers in fiber bundle 16. The optical signal propagates through each fiber in bundle 16 and is reflected back from the second end 24 of bundle 16 to first end 22. Test apparatus 14 during a learn mode determines the time the pulse travels through each fiber in bundle 16 and stores a variable corresponding to the length of each fiber 16 and the intensity of the reflected pulse as described herein in FIG. 4 and FIG. 5. Apparatus 14 compares during an interrogation mode the variable and intensity of the reflected pulse with an initially stored variable and initially stored intensity during a learn mode. If the compared variables and/or intensity vary by greater than a predetermined amount, apparatus 14 provides an alarm indication of a fault to headend 12 through signal lines 20 and provides an indication of the most recently recorded variable.

Figure 2:
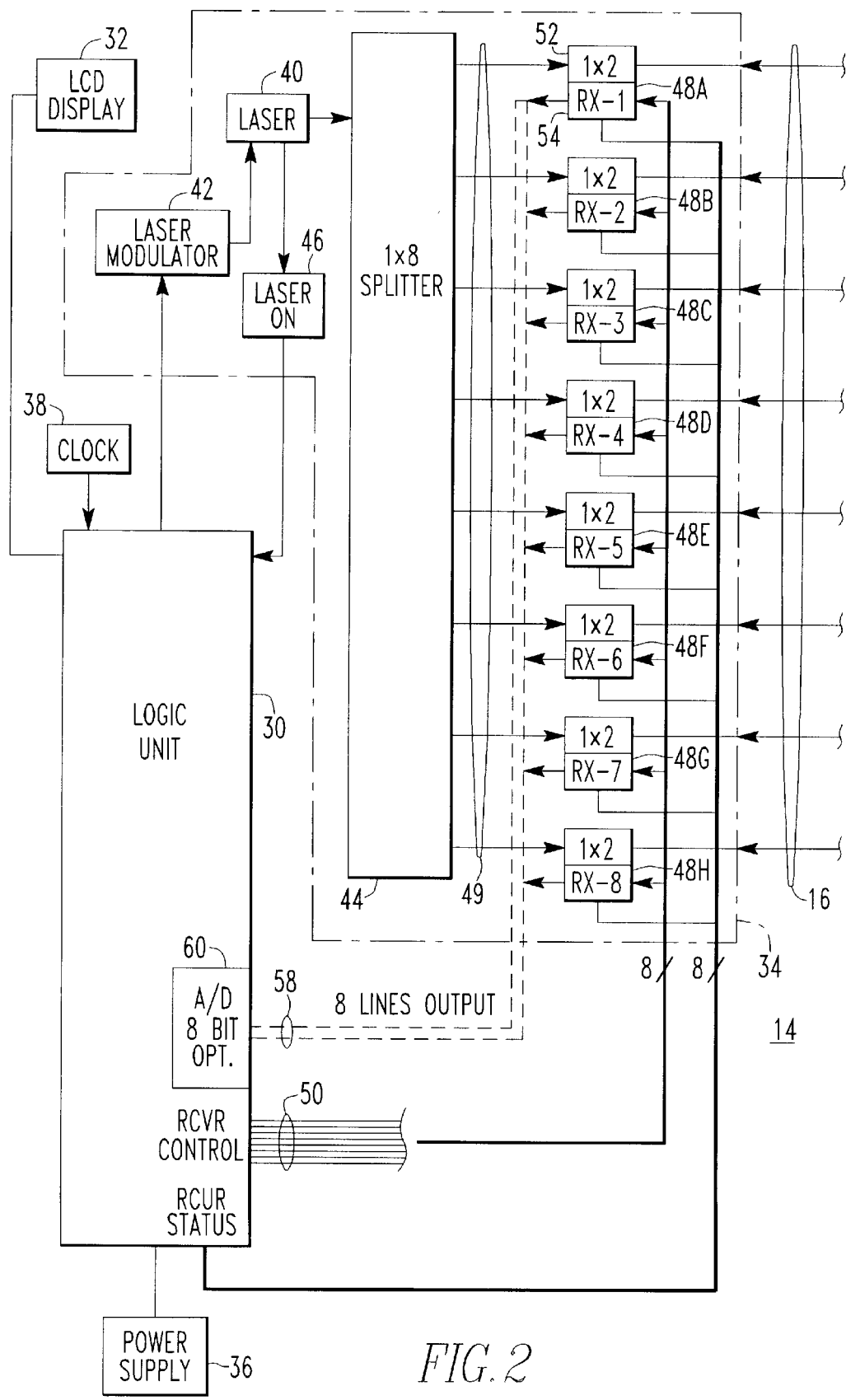
FIG. 2 is a schematic diagram of the test apparatus for determining the location of a fault shown in FIG. 1.

Referring to FIG. 2 there is shown the test apparatus 14 having a processor or logic unit 30 connected to display 32, optical device 34, power supply 36 and clock 38. One such logic unit is Model 6805 manufactured by Motorola of Phoenix, Ariz. Device 34 includes a diode laser 40 connected to laser modulator 42 and optical splitter 44. Laser 40 is connected through laser sensor 46 to unit 30 to indicate proper laser operation.

Optical device 34 also includes optical units 48A–48H coupled through lines 49 to the plurality of outputs of splitter 44. Optical units 48A–48H are individually enabled and disabled by receiver controller outputs 50 on unit 30. Each of units 48A–48H includes an optical coupler 52 and receiver (RX) 54. Diode 40 injects light through splitter 44 and coupler 52 to permit the optical signal to be passed to first end 22 (FIG. 1) of a respective fiber in bundle 16.

When each respective receiver 54 is enable, the reflected optical signal on the fiber in bundle 16 is passed through receiver 54 converted to a voltage signal and passed though lines 58 to analog to digital circuitry (A/D) 60 input of unit 30. A/D circuitry 60 converts the RF signal on line 58 to a digital signal corresponding to the intensity of the optical signal on the fiber in bundle 16.

Figure 3:
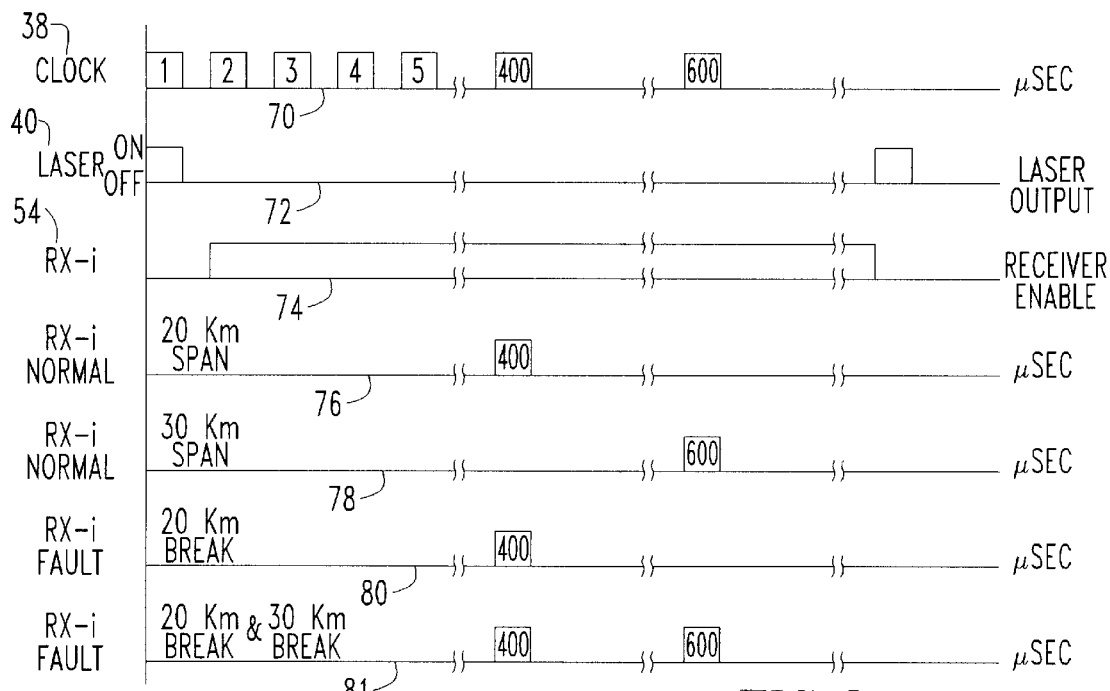
FIG. 3 is timing diagram of the output of the test apparatus shown in FIG. 2.

Referring to FIG. 3, there is shown a timing diagram of the output of the test apparatus 14. In line 70, there is shown the output of clock 38 for the example case of a frequency of 2 MHz and a 50/50 duty cycle. Line 72 shows the output of laser 40, which periodically generates an optical pulse. In line 74, the output of logic unit 30 on line 50 is shown. Line 50 when active enables a respective receiver 54 in units 48A–48H. Lines 76–81 shows an example of reflected pulses received by unit 48A when receiver 54 in unit 48A is enabled as on line 74.

In lines 76–78 there is shown an example reflected pulse received by a receiver 54 units 48A–48H for normal fiber lengths of 20 and 30 Km, respectively. In this example receiver 54 was enabled as on line 74. During the interrogation mode, line 80 shows the reflected pulse reved by one of units 48A–H for the case that the 30 Km fiber has a break at 20 Km. As shown there, the reflected pulse occurs at an earlier time than the reflected pulse occurring in the normal fiber shown in line 78. During the interrogation mode, line 81 shows two reflected pulses received by one of units 48A–H for the casehat a 40 Km fiber has a partial break at 20 Km and full break at 30 Km.

Figure 4:
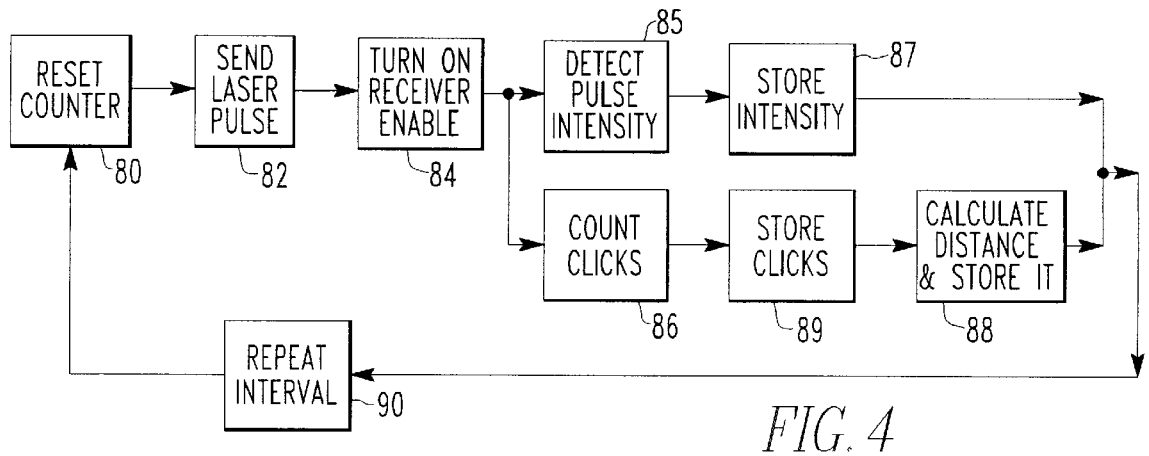
FIG. 4 is a flow diagram of a learn mode for determining and storing for each normal fiber its length and pulse intensity for the processor shown in FIG. 2.
Figure 5:
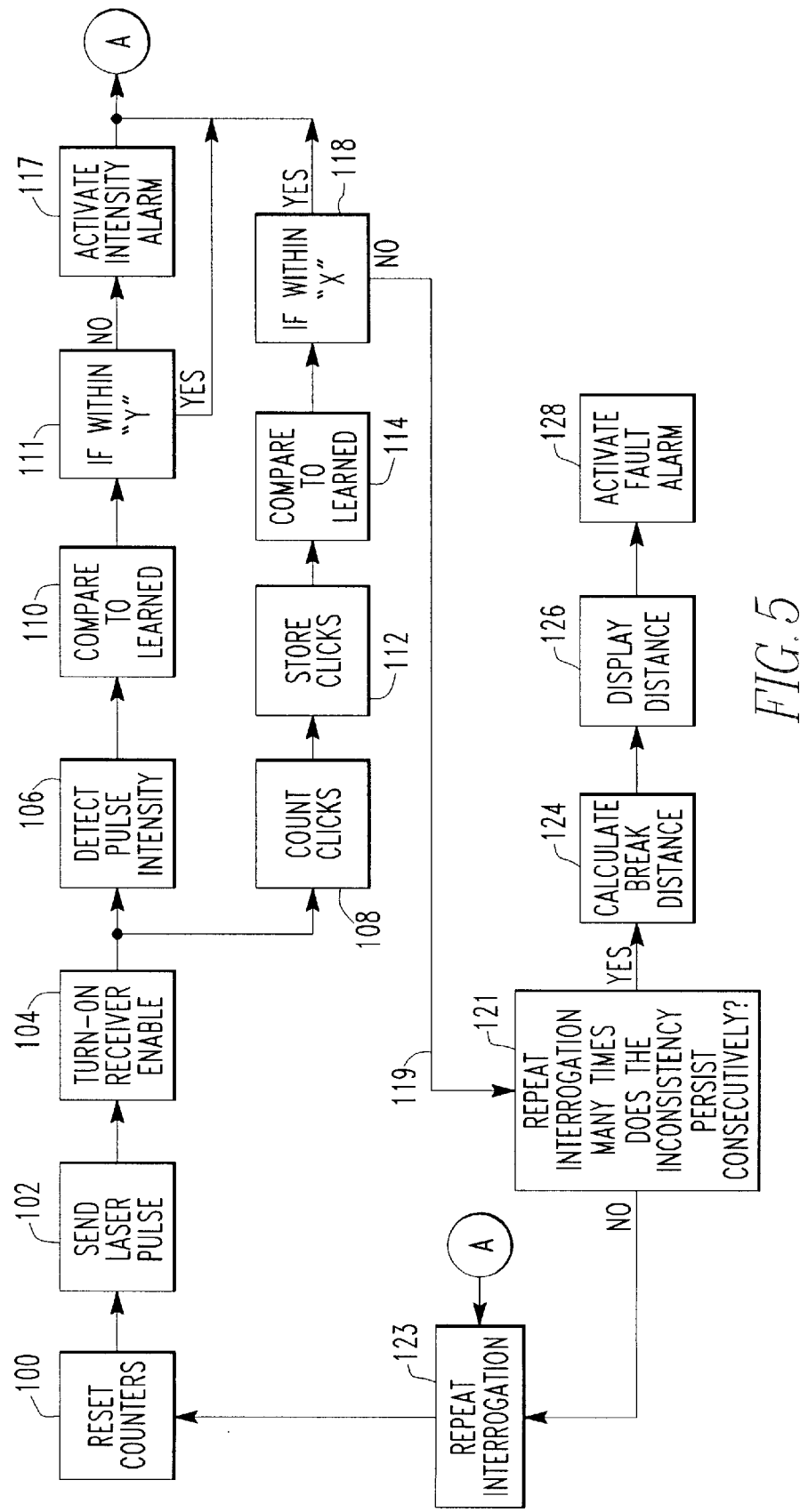
FIG. 5 is a flow diagram of an interrogation mode for each fiber to determine a fault for the processor shown in FIG. 2.

Referring to FIG. 4 and FIG. 5 there are shown the steps executed in software within unit 30 during a Learn Mode (FIG. 4) and Interrogation Mode (FIG. 5). In the learn mode, unit 30 acquires the initial length of each normal fiber and intensity of the optical signal propagating through each of the fibers in bundle 16 as described with reference to FIG. 1. In the interrogation mode, each fiber in bundle 16 is checked against the length and intensity acquired during the learn mode. Logic unit 30 may be set to learn mode and automatically switch after a preset period of time to interrogation mode. Alternately logic unit may receive controls from a remote source or switches, front panel display, etc. to switch between learn and interrogation mode.

Referring to FIG. 4, there is shown the learn mode having steps 80–90. In step 80 the internal counters in unit 30 are reset. In step 82 the laser 40 is turned on and a pulse is sent through optical device 34 down the fibers in bundle 16. Next in step 84, the unit 48A–48H corresponding to the fiber that is to be tested is enabled. In step 85 the logic unit monitors its A/D circuit 60 for the received reflected pulse while simultaneously counting the clock clicks in step 86. In step 87, the intensity of the received pulse by A/D circuitry 60 is stored in a first register while in step 89 the number of clicks counted in step 86 is recorded in a second register. In optional step 88, a variable corresponding to the length of the fiber in bundle 16 is calculated. The formula to calculate the distance is (the number of clock ticks) times the speed of light constant (C) times (1/clock frequency) divided by (n), where n is the constant for the refractive index of the core of the individual fiber. The fiber length, L; is calculated according to the well known formula: $L=(t/2)(c/n)$ where t is the total propagation time of the pulse from launch to reception in seconds and c is the speed of light in air, $c=3*10^8$ meters per second. This constant n can be downloaded from headend 12 to the processor 60 and set individually for different fiber types by the user. Next in step 90 after steps 88 and 87, steps 80–88 are repeated after a predetermined time period until the interrogation mode is enabled.

Referring to FIG. 5, there is shown the interrogation mode having steps 100–128. In step 100 the internal counters in unit 30 are reset. In step 102, laser 40 is turned on and a pulse is sent through optical device 34 to the fibers in bundle 16. Next in step 104, the one of units 48A–48H corresponding to the fiber that is to be tested is enabled. In step 106 the logic unit monitors its A/D circuit 60 for the intensity of the received pulse reflected in the fiber while simultaneously counting the clock ticks in step 108.

In step 110, the magnitude of the received pulse by A/D circuitry 60 is stored in a memory, and compared to the intensity recorded in step 87. In step 111 the processor determines if the intensity is within a "Y" predetermined amount. If it is, the processor executes step 123 where the interrogation mode process restarts a predetermined amount of time later. If it is not, the processor 30 executes step 117. In step 117, the processor sends an indication of the intensity stored in step 110 to the headend 12 or provides an indication on display 32 of apparatus 14 of the intensity to be reported. Either at the headend 12 or in apparatus an indication can be made whether this intensity is catastrophic or just a minor alarm.

Simultaneously to steps 106–117 in step 112, the number of clock clicks counted in step 108 is recorded in a second memory location. These clock clicks are recorded for one or two reflected pulses (see line 81 of FIG. 3). In step 114, a variable corresponding to the length of the fiber in bundle 16 is calculated or the variable recorded in the second memory location is compared against the variable recorded in step 89. In step 118 processor 30 determines if this comparison is within a predetermined amount. If so, the processor executes step 123 where the interrogation mode process restarts and steps 100–118 are repeated a predetermined time period later. If this variable is not within a predetermined amount ("X"), in step 121 an indication is stored indicating a failure. In step 121, this failure indication is checked to determine if this is the first failure or one of multiple consecutive failures. If it is a first failure, step 123 is executed. If the failure is reported a predetermined multiple and consecutive number times of then step 124 is executed.

In step 124 the distance is calculated using the number of clicks stored in the third register using the formula described in step 88. The distance is calculated for one reflected pulse as well as shown in line 80 of FIG. 3. In the case of a second reflected pulse as shown in line 81 of FIG. 3, the location of the break causing the second pulse can be determined using the similar method used to determine the first partial break. This calculated distance is then displayed on a display 32, fed to headend 12, or displayed on other indication device in step 126. In step 128 an alarm is indicated to headend 12 or to a display, or other indication device. After step 128, interrogation mode is repeated for each of the other fibers in bundle 16 to be tested.

It is noted that dark fibers may be tested, or alternated live fibers may be tested by using a pulse at a frequency other than the frequency of the signal being transmitted through the bundle.

While the principles of the invention have been made clear in the illustrated embodiments, there will be immediately obvious to those skilled in the art, many modifications and components used in the practice of the invention, which are particularly adapted for specific environments and operational requirements, can be used, without departing from those principles. The appended claims are therefore intended to cover and embrace any such modifications within the limits only of the true spirit and scope of the invention.

What is claimed is:

1. A method for detecting a fault in an optical fiber, the method comprising the steps of:

in a learn mode:
   (a) transmitting into a first end of a normal fiber under test a first pulse of optical energy;
   (b) detecting a time duration through which the first pulse propagates through the fiber from the first end and is reflected back to the first end;
   (c) storing a variable corresponding to the detected time duration of the pulse of optical energy;

in an interrogation mode:
   (d) transmitting into the first end of the fiber under test a second pulse of optical energy;
   (e) detecting a time duration through which the second pulse propagates through the fiber from the first end and is reflected back to the first end;
   (f) comparing the variable stored in step (c) with the time duration detected in step (e);
   (g) providing an error indication if the variable stored in step (c) varies greater than a predetermined amount from the time duration detected in step (e);
   (h) computing a location of the fault from the detected time duration of the second pulse of optical energy in step (e); and
   (i) repeating steps (d)–(h) a predetermined time period later.

2. The method as recited in claim 1 further comprising the steps of computing the distance between the first end and a fiber break when an error indication is provided by multiplying the location computed in step (h) by a constant; and providing a location of the fault in the fiber by indicating the length computed.

3. The method as recited in claim 1 further comprising the step of storing the computed variable in step (c) in a memory device.

4. The method as recited in claim 1 further comprising the step of reporting the error indication and location of the fault to a remote location.

5. The method as recited in claim 1 further comprising the steps of:
   detecting in step (b) an intensity of the first pulse after propagating through the fiber from the first end and being reflected back to the first end;
   detecting in step (e) an intensity of the second pulse after propagating through the fiber from the first end and being reflected back to the first end;
   comparing the intensity of the first pulse with the intensity of the second pulse; and
   providing an alarm indication if the intensity of the second pulse varies from the intensity of the first pulse by greater than a predetermined amount.

6. The method as recited in claim 1 further comprising the steps of repeating steps (a)–(i) for a plurality of fibers; and providing an error indication for each fiber that the time duration determined in step (e) varies greater than a predetermined amount from the variable stored in step (c).

7. The method as recited in claim 1 further comprising the steps of:
   detecting a propagation time of the multiple pulses being reflected due to partial fiber breaks; and
   calculating the location of the partial fiber breaks.

8. An apparatus for detecting a fault in an optical fiber comprising:
   first means for transmitting in a learn mode into a first end of normal fiber under test a first pulse of optical energy;
   means for detecting a propagation time of the first pulse propagating through the fiber from the first end and being reflected back to the first end;
   means for storing a variable corresponding to the detected propagation time of the first pulse of optical energy; and
   said first means transmitting, a predetermined time period later, into the first end of fiber under test a second pulse of optical energy;
   means for detecting a propagation time of the second pulse propagating through the fiber from the first end and being reflected back to the first end;
   means for comparing the stored variable from the propagation time of the first pulse of optical energy with the propagation time of the second pulse of optical energy, and providing an indication of the magnitude of the difference; and
   means for providing an error indication if the magnitude of the difference is greater than a predetermined amount.

9. The apparatus as recited in claim 8 further comprising means for storing from the detected time duration of the second pulse of optical energy as a variable corresponding to the length of the fiber under test through which the second pulse of optical energy travels.

10. The apparatus as recited in claim 8 wherein the means for detecting the propagation time comprises:
    means for generating a continuous stream of clock clicks having preset cycle time; and means for counting the number of clock clicks between when the optical pulse is transmitted and when the optical pulse is detected.

11. The method as recited in claim 8 further comprising means for coupling said transmitting means to a plurality of fibers; and said means for indicating an error providing an error indication for each fiber that the variable corresponding to the propagation time of the first pulse of optical energy when compared with the propagation time of the second pulse of optical energy varies greater than a predetermined amount.

12. An apparatus for detecting a fault in an optical fiber comprising:
    an optical transmitter transmitting into a first end of a fiber under test a first pulse of optical energy and for transmitting into the first end a predetermined time period later a second pulse of optical energy;
    an optical receiver detecting a propagation time of the first pulse and the second pulse propagating through the fiber from the first end and being reflected back to the first end; and
    a processor computing a variable corresponding to the length of the fiber under test from the detected propagation time of the first pulse of optical energy, said processor computing from the detected propagated time of the second pulse of optical energy a variable corresponding to the length of the fiber under test through which the second pulse of optical energy travels, said processor comparing the variable computed from the first pulse of optical energy with the variable computed from the second pulse of optical energy; and said processor providing an error indication if the variable computed from the second pulse of optical energy varies greater than a predetermined amount from the variable computed from the first pulse of optical energy.

13. The apparatus as recited in claim 12 further comprising means for detecting and storing the intensity of the first pulse and the second pulse; means for comparing the intensity of the first pulse with the intensity of the second pulse; and means for providing an indication if the intensity of the first pulse varies by greater than a predetermined amount from the intensity of the second pulse.

14. The apparatus as recited in claim 12 further comprising means for detecting a propagation time of a second reflection of the second pulse within the fiber under test caused by a second fault in the fiber under test; and means for providing an indication of a location of the second fault.

* * * * *